United States Patent [19]
Sakamoto et al.

[11] Patent Number: 5,805,248
[45] Date of Patent: Sep. 8, 1998

[54] ACTIVE MATRIX LIQUID CRYSTAL DISPLAY

[75] Inventors: Mitiaki Sakamoto; Hiroshi Shiba, both of Tokyo, Japan

[73] Assignee: NEC Corporation, Tokyo, Japan

[21] Appl. No.: 920,904

[22] Filed: Aug. 29, 1997

[30] Foreign Application Priority Data

Aug. 30, 1996 [JP] Japan .................................. 8-230594

[51] Int. Cl.[6] .......................... G02F 1/1343; G02F 1/136
[52] U.S. Cl. .............................. 349/48; 349/143; 345/93; 345/92; 345/98
[58] Field of Search ............................... 349/48, 39, 143; 345/92, 93, 98

[56] References Cited

U.S. PATENT DOCUMENTS

| | | | |
|---|---|---|---|
| 4,680,580 | 7/1987 | Kawahara ................................. | 345/90 |
| 4,770,501 | 9/1988 | Tamura et al. ............................ | 345/92 |
| 4,938,566 | 7/1990 | Takeda et al. ............................ | 349/39 |
| 5,194,974 | 3/1993 | Hamada et al. .......................... | 349/48 |
| 5,218,464 | 6/1993 | Hiroki et al. ............................. | 345/92 |
| 5,349,366 | 9/1994 | Suzuki et al. ............................. | 345/92 |
| 5,691,783 | 11/1997 | Numao et al. ............................ | 345/92 |
| 5,701,166 | 12/1997 | Fedorovish et al. ...................... | 349/38 |

*Primary Examiner*—William L. Sikes
*Assistant Examiner*—Kenneth Parker
*Attorney, Agent, or Firm*—Young & Thompson

[57] ABSTRACT

The present invention provides a circuitry of a liquid crystal display, comprising a plurality of signal lines extending in a first direction, a plurality of scanning lines extending in a second direction vertical to the first direction, first and second enable lines separated from each other, each of the first and second enable lines comprising a plurality of first parts extending in the first direction and between the signals lines and a second part extending in the second direction to which the first parts are connected; a plurality of pairs of first and second pixel electrodes being positioned in adjacent two pixels and also positioned at opposite sides of each of the signal lines; a series connection of first and second transistors between each of the first and second pixel electrodes and the signal line, the first transistor having a gate connected to each of the first and second enable lines while the second transistor having a gate connected to the scanning line.

12 Claims, 6 Drawing Sheets

FIG. 8B  Parity signal ⎯⎯⎯⎯⎯⎯⎯⎯⎯⎯⎯|_____

Pixel voltage ⎯⎯⎯⎯⎯⎯⎯⎯⎯⎯|⎯⎯ ΔV

ACTIVE MATRIX LIQUID CRYSTAL DISPLAY

BACKGROUND OF THE INVENTION

The present invention relates to a liquid crystal display, and amore particularly to an improved active matrix liquid crystal display.

A typical conventional active matrix liquid crystal display will be described with reference to FIG. 1. A plurality of scanning lines 1 are provided which extend in a row direction and in parallel to each other. A plurality of signal lines 2 are provided which extend in a column direction vertical to the row direction and in parallel to each other. The signal lines 2 are separated from the scanning lines 1 by an inter-layer insulator. The alignments of the scanning lines 1 and the signal lines 2 form arrays of a plurality of matrixes. Each matrix has a pair of a pixel 5 which acts as a pixel electrode and a thin film transistor 8 which is connected in series between the signal line 2 and the pixel 5. A gate of the thin film transistor 8 is connected to the scanning line 1. If VGA color display is required, then each pixel has three color dots corresponding to Red, Green and Blue. Since 640×480 pixels are provided, then a total number of the dots is 640 ×480×3. In this case, 480 scanning drivers (V driver) are required for scanning 480 of the scanning lines 1 and further 1920 signal drivers (H driver) are required for scanning the signal lines. Generally, the driver LSIs for the signal lines are required to accommodate data resistors, latch circuits and D/A converters, whilst the driver LSIs for the scanning lines comprise only shift resistors, for which reason the driver LSIs for the signal lines are higher in cost by two or three times than the driver LSIs for the scanning lines. This results in a high manufacturing cost of the active matrix liquid crystal display.

In the Japanese laid-open patent publications Nos. 3-38689 and 4-360127 that in order to settle the above problems, the number of the scanning lines is increased to two times thereof whilst the number of the signal lines is reduced to a half thereof, so that the number of the required expensive H drivers is reduced to a half thereof As illustrated in FIG. 2, A pair of pixel electrodes 5 and 6 are provided at opposite sides of each signal line 2 so that the pixel electrodes 5 and 6 are connected through the thin film transistors to each the signal line 2. The thin film transistor connected to the pixel electrode 5 has a gate connected to a first scanning line 1A whilst the thin film transistor connected to the pixel electrode 6 has a gate connected to a second scanning line 1B so that signals to be written into the pixel electrodes 5 and 6 are selected. For that reason, the number of the scanning lines 480×2=960 and the number of the signal lines 1920/2=960. In this circuit configuration, the number of the expensive H drivers is reduced to a half thereof. Even the number of the V drivers is large, the active matrix liquid crystal display may be reduced in cost.

In the Japanese laid-open patent publication No. 4-269791, it is disclosed that capacitance is connected to the signal line so that the signals are written into the line capacitance for time-division whereby it is possible to reduce the number of the H drivers without increase the number of the scanning lines. As illustrated in FIG. 3A, there are selected any of gate voltage terminals VG1 to VG480 as the plug electrodes so that one of the scanning lines is selected During the selection of one of the scanning lines, selective signals are sequentially supplied to selective signal terminals φ 1 to φ 48. During when one of the selective terminals is selected, display signals corresponding to 40 columns are supplied to the display signal terminals VD1 to VD40 and then written into the capacitors CL before each liquid crystal LC is driven through the driver thin film transistor. This can reduce the number o the drivers for the signal lines for reduction in cost of the liquid crystal display.

As illustrated in FIG. 3B, in the pixel, a transfer gate thin film transistor is provided which has a gate G7 connected to an enable line 3' applied with a selective signal "P", a drain D7 connected to the scanning line 1 and a source S7 connected to a gate G8 of a driver thin film transistor 8, so that the gate signal is selected only in the pixel where the transfer gate thin film transistor TFT7 is in ON state. Namely, when the transfer gate thin film transistor TFT7 is in ON state, then the signals are written into the liquid crystal CLC through the switching element thin film transistor TFT8. If, however, the transfer gate TFT7 is in OFF state, then no signal is written into the pixel even the gate signal is ON. For that reason, it is possible to reduce the number of the H drivers without increase in the number of the V drivers.

As described above, it is disclosed in the Japanese laid-open patent publications Nos. 3-38689 and 4-360127 to reduce the expensive H drivers by half whilst the number of the V drivers becomes double. For that reason, it might be difficult to obtain a remarkable reduction in the cost of the liquid crystal display.

By contrast, it is disclosed in the Japanese laid-open patent publication No. 4-269791 to reduce the number of the H driver by half without increase in the number of the V driver. It is, therefore, possible to reduce the cost of the liquid crystal display. Since, however, the gate signal is transmitted through the transfer gate thin film transistor into the gate of the switching thin film transistor, it is required to reduce the ON-resistance of the transfer gate thin film transistor into a low resistance which is closer to the gate line resistance. In order to satisfy this requirement for reduction in the ON resistance of the transfer gate thin film transistor, it is required that the transfer gate thin film transistor comprises an amorphous silicon thin film transistor. Actually, however, it is required to carry out complicated processes such as laser anneal for polycrystalization in order to fabricate the amorphous silicon thin film transistor.

In the above circumstances, it is required to develop a novel active matrix liquid crystal display with a low cost.

SUMMARY OF THE INVENTION

Accordingly, it is an object of the present invention to provide a novel active matrix liquid crystal display free from any disadvantage or problems as described above.

It is a further object of the present invention to provide a novel active matrix liquid crystal display with a low cost.

The above and other objects, features and advantages of the present invention will be apparent from the following descriptions.

The present invention provides a circuitry of a liquid crystal display, comprising a plurality of signal lines extending in a first direction, a plurality of scanning lines extending in a second direction vertical to the first direction, first and second enable lines separated from each other, each of the first and second enable lines comprising a plurality of first parts extending in the first direction and between the signals lines and a second part extending in the second direction to which the first parts are connected; a plurality of pairs of first and second pixel electrodes being positioned in adjacent two pixels and also positioned at opposite sides of each of the signal lines; a series connection of first and second transistors between each of the first and second pixel electrodes and the signal line, the first transistor having a gate connected to each of the first and second enable lines whilst the second transistor having a gate connected to the scanning line.

BRIEF DESCRIPTIONS OF THE DRAWINGS

Preferred embodiments according to the present invention will be described in detail with reference to the accompanying drawings.

FIG. 8B is a diagram illustrative of waveforms of parity signal and variation in pixel voltage caused by a pixel with a gate-source parasitic capacitance of a pixel in a novel conventional active matrix liquid crystal display in a second embodiment according to the present invention.

DISCLOSURE OF THE INVENTION

Figure 1:
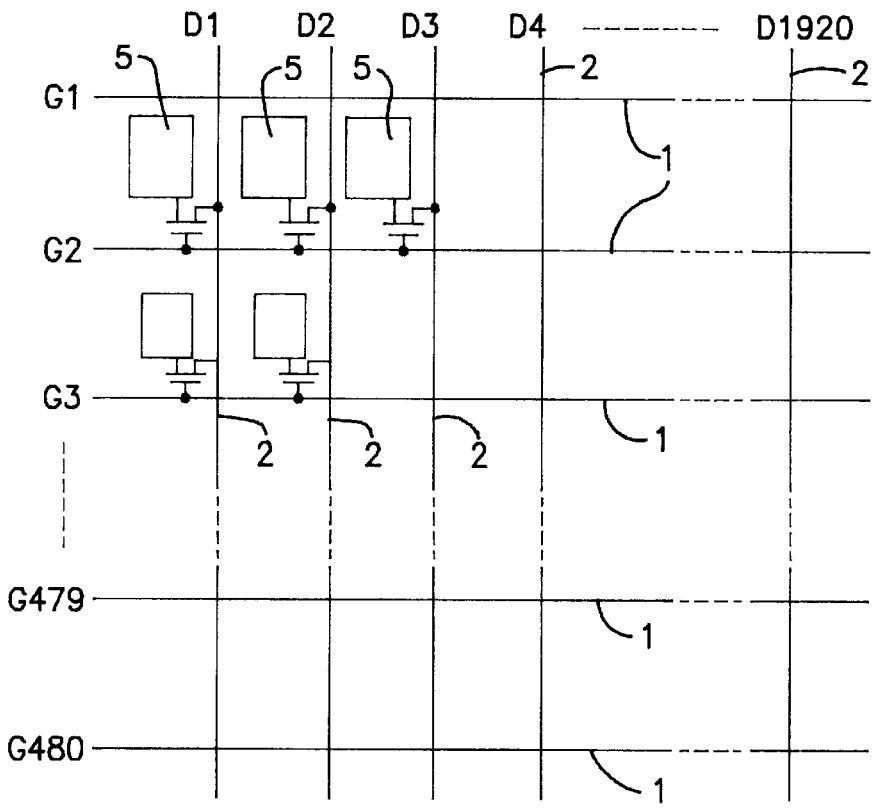
FIG. 1 is a diagram illustrative of the first conventional active matrix liquid crystal display.
Figure 2:
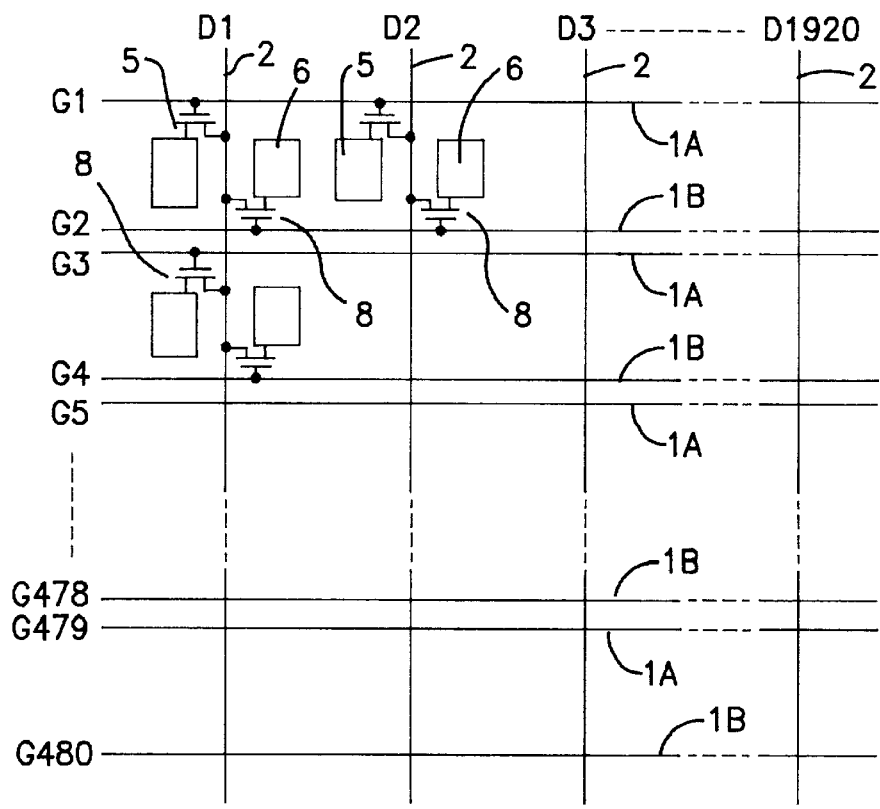
FIG. 2 is a diagram illustrative of the second conventional active matrix liquid crystal display.
Figure 3A:
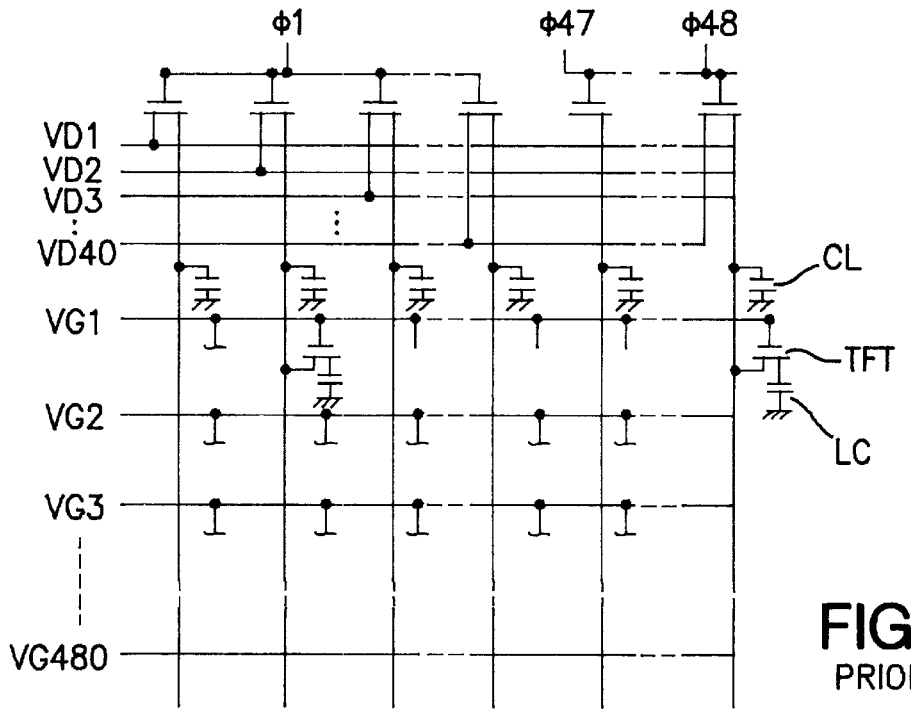
FIG. 3A is a diagram illustrative of the third conventional active matrix liquid crystal display.
Figure 3B:
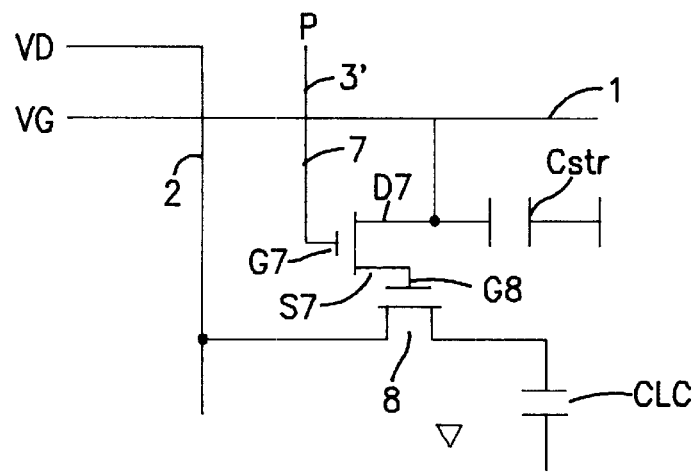
FIG. 3B is a circuit diagram illustrative of the third conventional active matrix liquid crystal display.

The present invention provides a circuitry of a liquid crystal display, comprising a plurality of signal lines extending in a first direction, a plurality of scanning lines extending in a second direction vertical to the first direction, first and second enable lines separated from each other, each of the first and second enable lines comprising a plurality of first parts extending in the first direction and between the signals lines and a second part extending in the second direction to which the first parts are connected; a plurality of pairs of first and second pixel electrodes being positioned in adjacent two pixels and also positioned at opposite sides of each of the signal lines; a series connection of first and second transistors between each of the first and second pixel electrodes and the signal line, the first transistor having a gate connected to each of the first and second enable lines whilst the second transistor having a gate connected to the scanning line.

It is preferable that the first and second enable lines are applied with first and second enable signals respectively and the first and second enable signals are inverted for every frames but are different in phase inversely.

It is also preferable that the first transistor is directly connected to the pixel electrode whilst the second transistor is directly connected to the signal line.

It is also preferable that the second transistor is directly connected to the pixel electrode whilst the first transistor is directly connected to the signal line.

The present invention provides a circuitry of a liquid crystal display, comprising: a plurality of signal lines extending in a first direction; a plurality of scanning lines extending in a second direction vertical to the first direction; first and second enable lines separated from each other; a plurality of pairs of first and second pixel electrodes being positioned in adjacent two pixels and also positioned at opposite sides of each of the signal lines; a series connection of first and second transistors between each of the first and second pixel electrodes and the signal line, the first transistor having a gate connected to each of the first and second enable lines whilst the second transistor having a gate connected to the scanning line.

It is also preferable that a the first and second enable lines are applied with first and second enable signals respectively and the first and second enable signals are inverted for every frames but are different in phase inversely.

It is also preferable that the first transistor is directly connected to the pixel electrode whilst the second transistor is directly connected to the signal line.

It is also preferable that the second transistor is directly connected to the pixel electrode whilst the first transistor is directly connected to the signal line.

It is also preferable that each of the first and second enable lines comprising a plurality of first parts extending in the first direction and between the signals lines and a second part extending in the second direction to which the first parts are connected.

The present invention provides an active matrix liquid crystal display, comprising: a plurality of signal lines extending in a first direction; a plurality of scanning lines extending in a second direction vertical to the column direction first and second enable lines separated from each other, each of the first and second enable lines comprising a plurality of first parts extending in the first direction and between the signals lines and a second part extending in the second direction to which the first parts are connected; a plurality of pairs of first and second pixel electrodes being positioned in adjacent two pixels and also positioned at opposite sides of each of the signal lines; a series connection of first and second transistors between each of the first and second pixel electrodes and the signal line, the first transistor having a gate connected to each of the first and second enable lines whilst the second transistor having a gate connected to the scanning line, wherein the first and second enable lines are applied with first and second enable signals respectively and the first and second enable signals are inverted for every frames but are different in phase inversely.

It is also preferable that the first transistor is directly connected to the pixel electrode whilst the second transistor is directly connected to the signal line.

It is also preferable that the second transistor is directly connected to the pixel electrode whilst the first transistor is directly connected to the signal line.

EMBODIMENTS

Figure 4B:
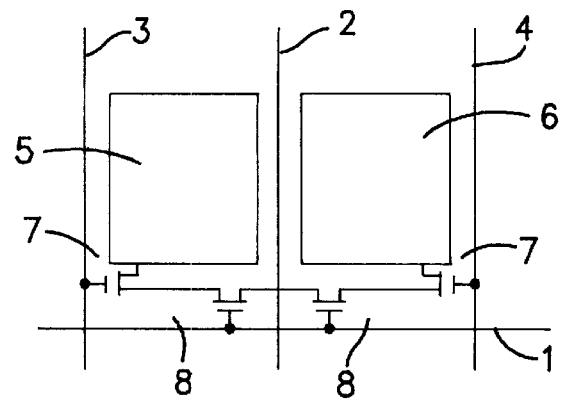
FIG. 4B is a circuit diagram illustrative of adjacent two pixels in a novel conventional active matrix liquid crystal display in a first embodiment according to the present invention.
Figure 4A:
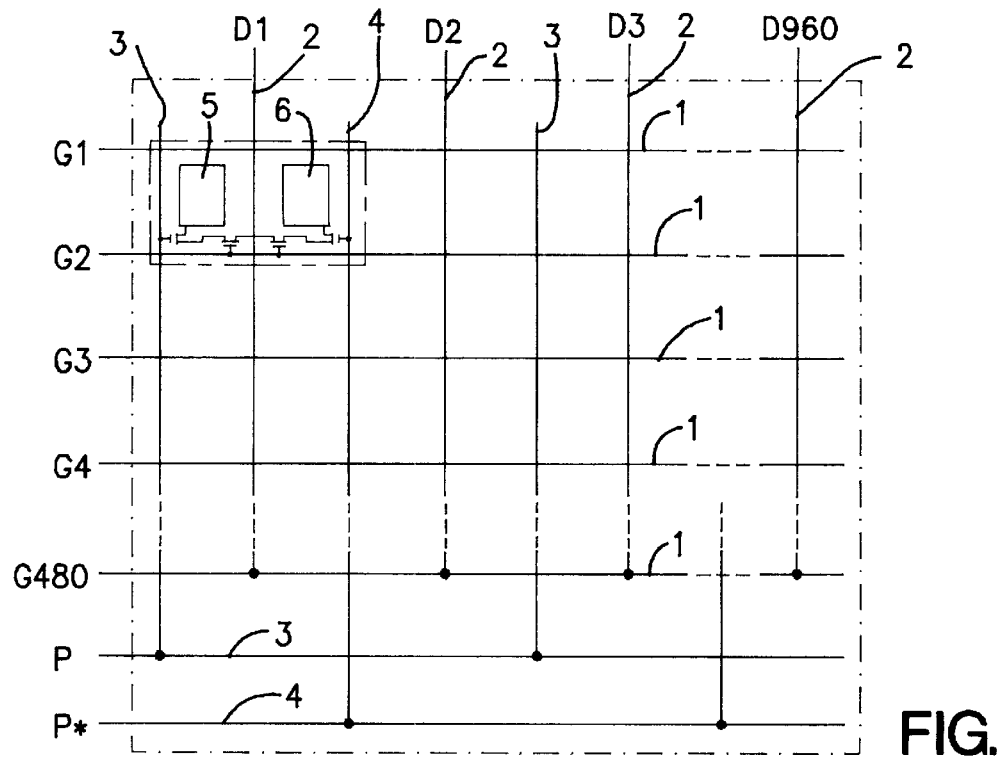
FIG. 4A is a diagram illustrative of a novel conventional active matrix liquid crystal display in a first embodiment according to the present invention.
Figure 5:
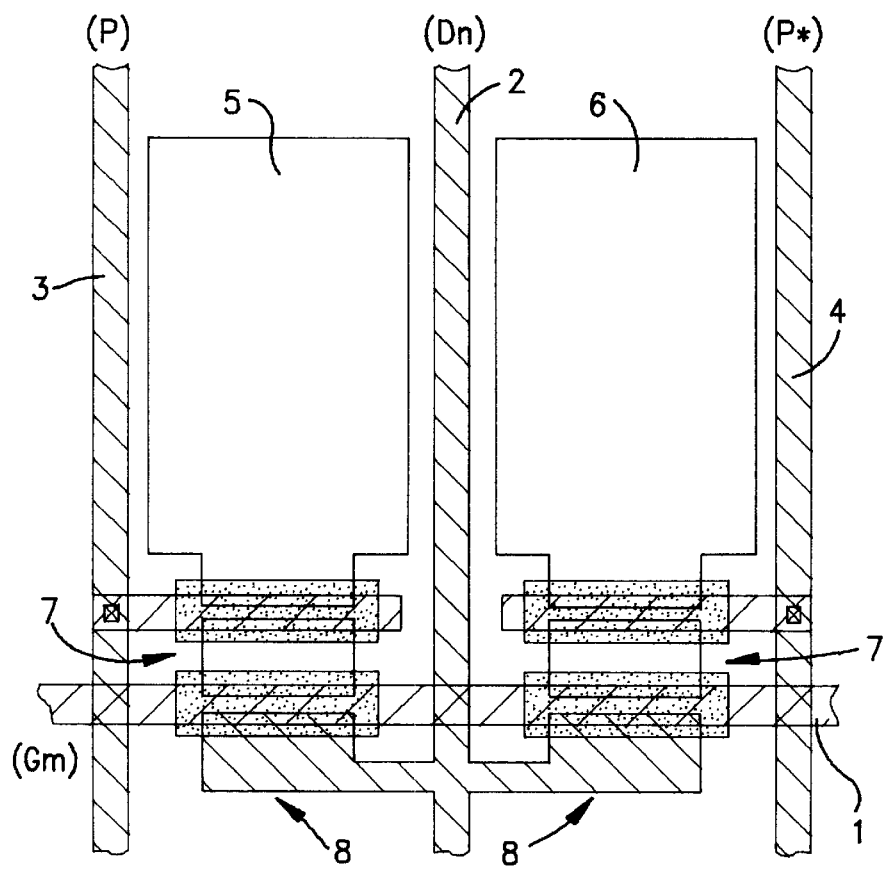
FIG. 5 is a plane view illustrative of adjacent two pixels in a novel conventional active matrix liquid crystal display in a first embodiment according to the present invention.
Figure 6:
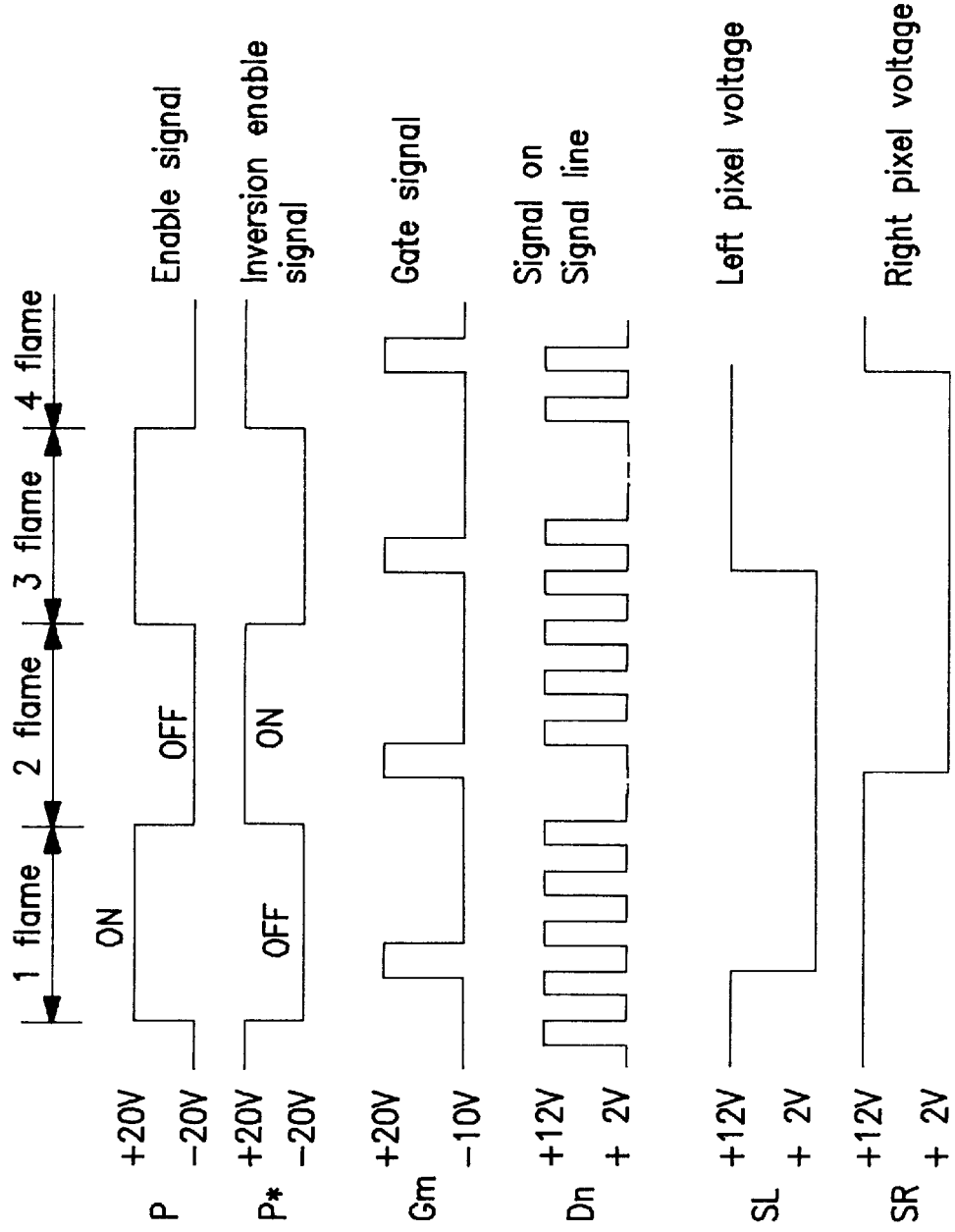
FIG. 6 is a diagram illustrative of adjacent two pixels in a novel conventional active matrix liquid crystal display in a first embodiment according to the present invention.

A first embodiment according to the present invention will be described in detail with reference to FIGS. 4A, 4B, 5 and 6. FIG. 4A is a diagram illustrative of a novel conventional active matrix liquid crystal display in this first embodiment according to the present invention. FIG. 4B is a circuit diagram illustrative of adjacent two pixels in a novel conventional active matrix liquid crystal display in this first embodiment according to the present invention. FIG. 5 is a plane view illustrative of adjacent two pixels in a novel conventional active matrix liquid crystal display in this first embodiment according to the present invention. FIG. 6 is a diagram illustrative of adjacent two pixels in a novel conventional active matrix liquid crystal display in this first embodiment according to the present invention.

As illustrated in FIG. 4A, a VGA liquid crystal display is provided which has 640×3(RGB)×480 dots. 480 scanning lines 1 (G1-G480) are provided to extend in row direction. 960 signal lines 2 (D1-D960) are also provided to extend in column direction vertical to row direction. A pair of adjacent two pixels 5 and 6 are provided at opposite sides of each signal line 2 and are indirectly connected to the same signal line 2. The adjacent two pixels 5 and 6 are also provided to be connected to the same scanning line 1. A pair of enable lines 3 and 4 are further provided to extend in the column direction wherein the enable lines 3 and 4 are alternately provided between the signal lines 2. This means that each of the signal lines 2 is also provided between the paired enable lines 3 and 4. The individual enable lines 3 extending in the column direction are connected directly to an enable row line which extends in row direction so that the individual enable lines 3 extending in the column direction are connected to each other through the enable row line, for which reason it may be regarded that the individual enable lines 3 extending in the column direction and the enable row line extending in the row direction would form a single enable line 3. Also, the individual enable lines 4 extending in the column direction are connected directly to an enable row line which extends in row direction so that the individual enable lines 4 extending in the column direction are connected to each other through the enable row line, for which reason it may be regarded that the individual enable lines 4 extending in the column direction and the enable row line extending in the row direction would form a single enable line 4.

As illustrated in FIG. 4B, in each pixel, a transfer gate thin film transistor 7 and a driver thin film transistor 8 are provided. The transfer gate thin film transistor 7 and a driver thin film transistor 8 are connected in series between the signal line 2 and the pixel 5. The adjacent pixel 6 is also connected through a series connection of the transfer gate thin film transistor 7 and the driver thin film transistor 8 to the same signal line 2. A gate of the driver thin film transistor 8 is connected to the scanning line 1.

As illustrated in FIG. 5, gate electrodes S and 6 comprise Cr. The transfer gate thin film transistor 7 and a driver thin film transistor 8 have amorphous silicon layers. The drain electrodes comprise Cr. The pixel electrodes 5 and 6 comprise indium tin oxide layers.

As illustrated in FIG. 6, enable signals P and P* transmitting on the enable lines 3 and 4 are inverted at a 50 Hz frame frequency and differ in phase by 180 degrees. A gate signal Gm is applied onto the scanning line 1. A signal Dn is applied onto the signal line 2. The pixel 5 has a voltage variation SL and the pixel 6 has a voltage variation SR.

Signals are written into the pixels as follows. During the odd number frames where the enable signal P on the enable line 3 is in ON, the signals are written into the pixel 5 in accordance with the canning of the scanning line 1. During the even number frames where the enable signal P* on the enable line 4 is in ON, the signals are written into the pixel 5 in accordance with the canning of the scanning line 1. The timing of writing the signals into the adjacent two pixels 5 and 6 may be controllable by the enable signals P and P* so that the signals are allocated into the adjacent two pixels S and 6. This means that it is possible to reduce by half the number of the signal lines 2 by providing only two enable lines 3 and 4 without increase in the number of the scanning lines. This also means that the number of the H driver may be reduced by half without increase in the number of the V driver, whereby the cost of the liquid crystal display is reduced.

SECOND EMBODIMENT

Figure 7A:
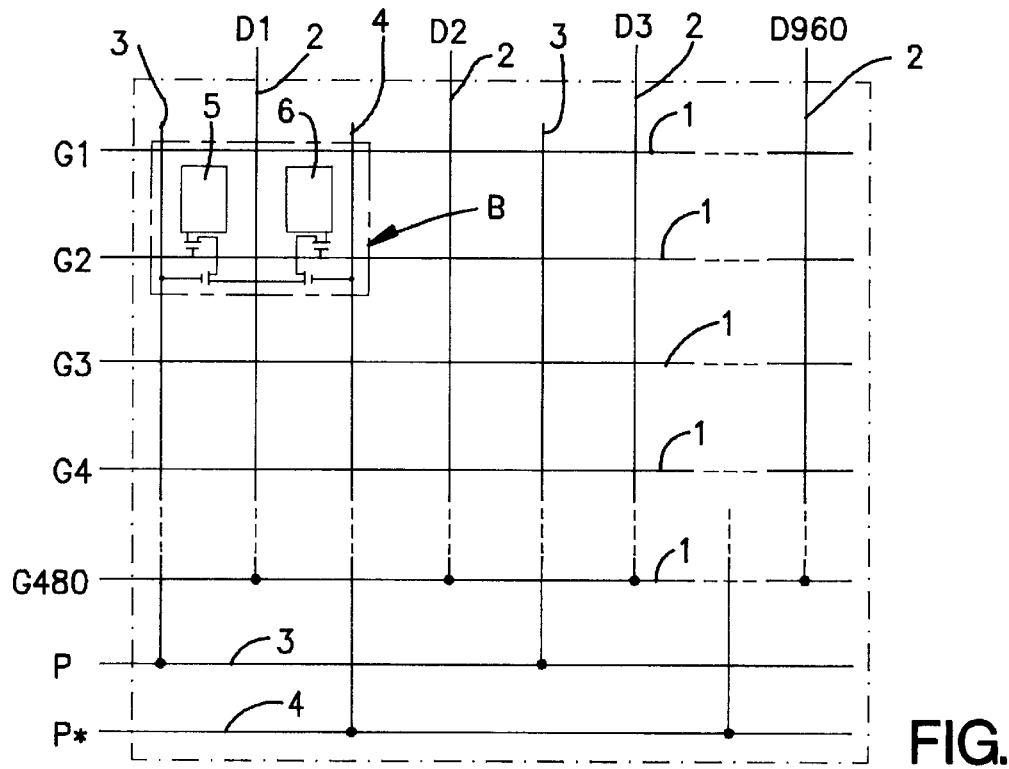
FIG. 7A is a diagram illustrative of a novel conventional active matrix liquid crystal display in a second embodiment according to the present invention.
Figure 9:
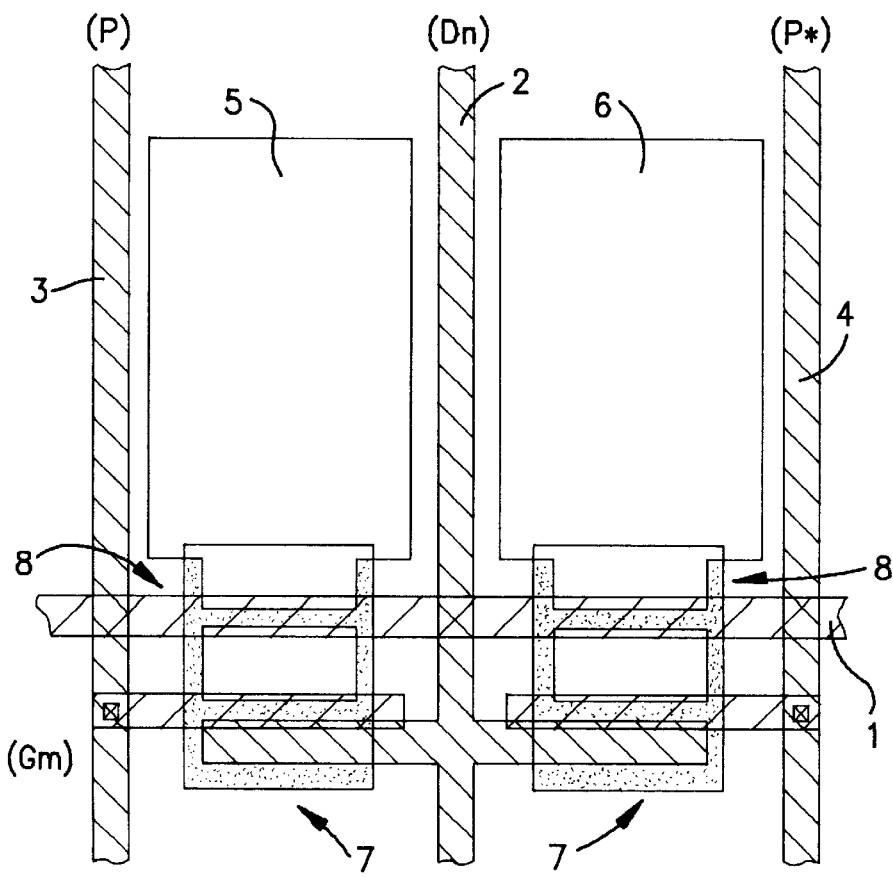
FIG. 9 is a plane view illustrative of adjacent two pixels in a novel conventional active matrix liquid crystal display in a second embodiment according to the present invention.
Figure 7B:
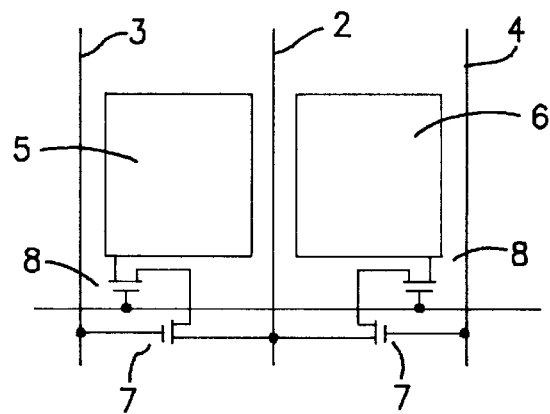
FIG. 7B is a circuit diagram illustrative of adjacent two pixels in a novel conventional active matrix liquid crystal display in a second embodiment according to the present invention.
Figure 8A:
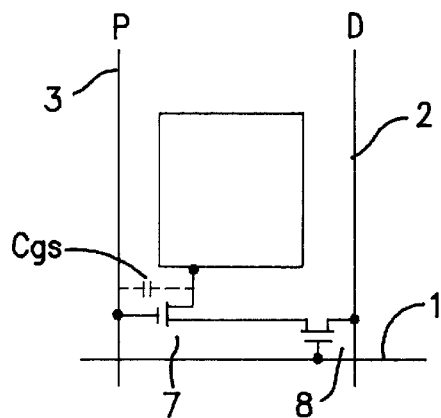
FIG. 8A is a circuit diagram illustrative of a pixel with a gate-source parasitic capacitance of a pixel in a novel conventional active matrix liquid crystal display in a second embodiment according to the present invention.

A second embodiment according to the present invention will be described in detail with reference to FIGS. 7A, 7B, 8A, 8B and 9. FIG. 7A is a diagram illustrative of a novel conventional active matrix liquid crystal display in this second embodiment according to the present invention. FIG. 7B is a circuit diagram illustrative of adjacent two pixels in a novel conventional active matrix liquid crystal display in this second embodiment according to the present invention. FIG. 8A is a circuit diagram illustrative of a pixel with a gate-source parasitic capacitance of a pixel in a novel conventional active matrix liquid crystal display in the second embodiment according to the present invention. FIG. 8B is a diagram illustrative of waveforms of parity signal and variation in pixel voltage caused by a pixel with a gate-source parasitic capacitance of a pixel in a novel conventional active matrix liquid crystal display in the second embodiment according to the present invention. FIG. 9 is a plane view illustrative of adjacent two pixels in a novel conventional active matrix liquid crystal display in the second embodiment according to the present invention.

As illustrated in FIG. 7A, a VGA liquid crystal display is provided which has 640×3(RGB)×480 dots. 480 scanning lines 1 (G1-G480) are provided to extend in row direction. 960 signal lines 2 (D1-D960) are also provided to extend in column direction vertical to row direction. A pair of adjacent two pixels S and 6 are provided at opposite sides of each signal line 2 and are indirectly connected to the same signal line 2. The adjacent two pixels 5 and 6 are also provided to be connected to the same scanning line 1. A pair of enable lines 3 and 4 are further provided to extend in the column direction wherein the enable lines 3 and 4 are alternately provided between the signal lines 2. This means that each of the signal lines 2 is also provided between the paired enable lines 3 and 4. The individual enable lines 3 extending in the column direction are connected directly to an enable row line which extends in row direction so that the individual enable lines 3 extending in the column direction are connected to each other through the enable row line, for which reason it may be regarded that the individual enable lines 3 extending in the column direction and the enable row line extending in the row direction would form a single enable line 3. Also, the individual enable lines 4 extending in the column direction are connected directly to an enable row line which extends in row direction so that the individual enable lines 4 extending in the column direction are connected to each other through the enable row line, for which reason it may be regarded that the individual enable lines 4 extending in the column direction and the enable row line extending in the row direction would form a single enable line 4.

As illustrated in FIG. 7B, in each pixel, a transfer gate thin film transistor 7 and a driver thin film transistor 8 are provided. The driver thin film transistor 8 and the transfer gate thin film transistor 7 are connected in series between the signal line 2 and the pixel 5. The adjacent pixel 6 is also connected through a series connection of the driver thin film transistor 8 and the transfer gate thin film transistor 7 to the same signal line 2. A gate of the driver thin film transistor 8 is connected to the scanning line 1.

Differently from the second embodiment, a gate-source parasitic capacitance Cgs may be formed between the source and gate of the transfer gate thin film transistor 7 as illustrated in FIG. 8A. The gate-source parasitic capacitance Cgs causes variation in voltage of the pixel as illustrated in FIG. 8B.

In the second embodiment, in order to suppress the gate-source parasitic capacitance Cgs, the driver thin film transistor 8 is directly connected to the pixel.

As illustrated in FIG. 9, gate electrodes 5 and 6 comprise Cr. The transfer gate thin film transistor 7 and a driver thin film transistor 8 have amorphous silicon layers. The drain electrodes comprise Cr. The pixel electrodes 5 and 6 comprise indium tin oxide layers.

As illustrated in FIG. 6, enable signals P and P* transmitting on the enable lines 3 and 4 are inverted at a 50 Hz frame frequency and differ in phase by 180 degrees. A gate signal Gm is applied onto the scanning line 1. A signal Dn is applied onto the signal line 2. The pixel 5 has a voltage variation SL and the pixel 6 has a voltage variation SR.

Signals are written into the pixels as follows. During the odd number frames where the enable signal P on the enable line 3 is in ON, the signals are written into the pixel 5 in accordance with the canning of the scanning line 1. During the even number frames where the enable signal P* on the enable line 4 is in ON, the signals are written into the pixel 5 in accordance with the canning of the scanning line 1. The timing of writing the signals into the adjacent two pixels 5 and 6 may be controllable by the enable signals P and P* so that the signals are allocated into the adjacent two pixels 5 and 6. This means that it is possible to reduce by half the number of the signal lines 2 by providing only two enable lines 3 and 4 without increase in the number of the scanning lines. This also means that the number of the H driver may be reduced by half without increase in the number of the V driver, whereby the cost of the liquid crystal display is reduced.

As described above, the driver thin film transistor 8 is directly connected to the pixel in order to suppress the gate-source parasitic capacitance Cgs to make the pixel electrode free from the influences of the timing of inversion of the enable signal.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A circuitry of a liquid crystal display, comprising:
   a plurality of signal lines extending in a first direction;
   a plurality of scanning lines extending in a second direction vertical to said first direction;
   first and second enable lines separated from each other, each of said first and second enable lines comprising a plurality of first parts extending in said first direction and between said signals lines and a second part extending in said second direction to which said first parts are connected;
   a plurality of pairs of first and second pixel electrodes being positioned in adjacent two pixels and also positioned at opposite sides of each of said signal lines;
   a series connection of first and second transistors between each of said first and second pixel electrodes and said signal line, said first transistor having a gate connected to each of said first and second enable lines whilst said second transistor having a gate connected to said scanning line.

2. The circuitry as claimed in claim 1, wherein said first and second enable lines are applied with first and second enable signals respectively and said first and second enable signals are inverted for every frames but are different in phase inversely.

3. The circuitry as claimed in claim 1, wherein said first transistor is directly connected to said pixel electrode whilst said second transistor is directly connected to said signal line.

4. The circuitry as claimed in claim 1, wherein said second transistor is directly connected to said pixel electrode whilst said first transistor is directly connected to said signal line.

5. A circuitry of a liquid crystal display, comprising:
   a plurality of signal lines extending in a first direction;
   a plurality of scanning lines extending in a second direction vertical to said first direction;
   first and second enable lines separated from each other;
   a plurality of pairs of first and second pixel electrodes being positioned in adjacent two pixels and also positioned at opposite sides of each of said signal lines;
   a series connection of first and second transistors between each of said first and second pixel electrodes and said signal line, said first transistor having a gate connected to each of said first and second enable lines whilst said second transistor having a gate connected to said scanning line.

6. The circuitry as claimed in claim 5, wherein said first and second enable lines are applied with first and second enable signals respectively and said first and second enable signals are inverted for every frames but are different in phase inversely.

7. The circuitry as claimed in claim 5, wherein said first transistor is directly connected to said pixel electrode whilst said second transistor is directly connected to said signal line.

8. The circuitry as claimed in claim 5, wherein said second transistor is directly connected to said pixel electrode whilst said first transistor is directly connected to said signal line.

9. The circuitry as claimed in claim 5, wherein each of said first and second enable lines comprising a plurality of first parts extending in said first direction and between said signals lines and a second part extending in said second direction to which said first parts are connected.

10. An active matrix liquid crystal display, comprising:
    a plurality of signal lines extending in a first direction;
    a plurality of scanning lines extending in a second direction vertical to said column direction;
    first and second enable lines separated from each other, each of said first and second enable lines comprising a plurality of first parts extending in said first direction and between said signals lines and a second part extending in said second direction to which said first parts are connected;
    a plurality of pairs of first and second pixel electrodes being positioned in adjacent two pixels and also positioned at opposite sides of each of said signal lines;

a series connection of first and second transistors between each of said first and second pixel electrodes and said signal line, said first transistor having a gate connected to each of first and said second enable lines whilst said second transistor having a gate connected to said scanning line, wherein said first and second enable lines are applied with first and second enable signals respectively and said first and second enable signals are inverted for every frames but are different in phase inversely.

11. The circuitry as claimed in claim 10, wherein said first transistor is directly connected to said pixel electrode whilst said second transistor is directly connected to said signal line.

12. The circuitry as claimed in claim 10, wherein said second transistor is directly connected to said pixel electrode whilst said first transistor is directly connected to said signal line.

* * * * *